US008411649B2

(12) United States Patent
Stadelmeier et al.

(10) Patent No.: US 8,411,649 B2
(45) Date of Patent: Apr. 2, 2013

(54) BANDWIDTH ORIENTED RECONFIGURATION OF WIRELESS AD HOC NETWORKS

(75) Inventors: Lothar Stadelmeier, Stuttgart (DE); Frank Dawidowsky, Stuttgart (DE); Jens Hoefflinger, Stuttgart (DE)

(73) Assignee: Sony Deutschland GmbH, Köln (DE)

( * ) Notice: Subject to any disclaimer, the term of this patent is extended or adjusted under 35 U.S.C. 154(b) by 859 days.

(21) Appl. No.: 10/524,447

(22) PCT Filed: Aug. 14, 2003

(86) PCT No.: PCT/EP03/09062
§ 371 (c)(1),
(2), (4) Date: Oct. 13, 2005

(87) PCT Pub. No.: WO2004/017568
PCT Pub. Date: Feb. 26, 2004

(65) Prior Publication Data
US 2006/0105711 A1    May 18, 2006

(30) Foreign Application Priority Data

Aug. 14, 2002  (EP) .................................... 02018385

(51) Int. Cl.
*H04W 4/00* (2009.01)
(52) U.S. Cl. ..... 370/338; 455/418; 455/439; 455/452.2; 455/41.2; 455/519
(58) Field of Classification Search .................. 370/338, 370/346, 348, 350, 41.2; 455/418–420, 436–444, 455/450–453, 516–519
See application file for complete search history.

(56) References Cited

U.S. PATENT DOCUMENTS
(Continued)

FOREIGN PATENT DOCUMENTS

| DE | 100 53 809 | 5/2002 |
|---|---|---|
| WO | WO 99/14897 | 3/1999 |

(Continued)

OTHER PUBLICATIONS

Villela D et al: "Virtuosity: Programmable resource management for spawning networks" Computer Networks, Elsevier Science Publishers B.V., Amsterdam, NL, vol. 36, No. 1, Jun. 2001, pp. 49-73, XP004304884.

(Continued)

*Primary Examiner* — Marcos Torres
(74) *Attorney, Agent, or Firm* — Oblon, Spivak, McClelland, Maier & Neustadt, L.L.P.

(57) ABSTRACT

A first wireless ad hoc network with a certain available amount of bandwidth comprises a plurality of wireless terminals communicating via wireless connections with each other. Each wireless connection requires a certain amount of the available amount of bandwidth. A problem occurs, if a wireless terminal wants to set up a new wireless connection requiring bandwidth or requires more bandwidth for an existing wireless connection and the required amount of bandwidth exceeds the left amount of the available amount of bandwidth of the first wireless ad hoc network. In a state of the art wireless ad hoc network the requested bandwidth cannot be provided and a user application may not be possible. According to the invention, however, the required amount of bandwidth can be provided by splitting the first wireless ad hoc network such that a second wireless ad hoc network is spawned which operates in a different communication channel and thus provides additional bandwidth. The second wireless ad hoc network comprises wireless terminals of the first wireless ad hoc network and/or new wireless terminals.

13 Claims, 7 Drawing Sheets

U.S. PATENT DOCUMENTS

| | | | |
|---|---|---|---|
| 6,026,297 A * | 2/2000 | Haartsen | 455/426.1 |
| 6,850,502 B1 * | 2/2005 | Kagan et al. | 370/330 |
| 7,016,372 B2 * | 3/2006 | Haartsen | 370/461 |
| 7,206,586 B2 * | 4/2007 | Kim et al. | 455/450 |
| 2002/0018448 A1 | 2/2002 | Amis et al. | |
| 2002/0131387 A1 * | 9/2002 | Pitcher et al. | 370/338 |
| 2002/0197998 A1 * | 12/2002 | Schmidt | 455/452 |
| 2003/0035388 A1 * | 2/2003 | Schmidt | 370/329 |
| 2003/0076842 A1 * | 4/2003 | Johansson et al. | 370/401 |
| 2004/0204046 A1 * | 10/2004 | Bonta et al. | 455/556.1 |

FOREIGN PATENT DOCUMENTS

| | | |
|---|---|---|
| WO | WO 01/41377 A1 | 6/2001 |
| WO | WO 02/37770 A2 | 5/2002 |

OTHER PUBLICATIONS

Campbell A T et al: "Spawning Networks" IEEE Network, IEEE Inc. New York, US, Jul. 1999, pp. 16-29, XP000875025.

* cited by examiner

BANDWIDTH ORIENTED RECONFIGURATION OF WIRELESS AD HOC NETWORKS

The invention is related to wireless ad hoc networks which comprise a central controller and a set of wireless terminals (also referred to as wireless devices). In particular, the invention is related to a method and means for providing additional bandwidth for a wireless, ad hoc network if the available bandwidth is not sufficient.

A wireless ad hoc network is a collection of autonomous nodes or wireless terminals that communicate with each other by forming a radio network and maintaining connectivity in a decentralized manner. Since the nodes communicate over wireless connections, they have to contend with the effects of radio communication, such as noise, fading, and interference. In addition, the connections typically have less bandwidth than in a wired network. The network topology is in general dynamic, because the connectivity among the nodes may vary with time due to node departures, new node arrivals, and the possibility of having mobile nodes.

For a variety of home multimedia applications and business applications, it is important to establish networks, preferably wireless networks, for exchanging data and messages between different devices that are part of the network. In a typical business application scenario, a mobile terminal gets services over a fixed corporate or public infrastructure. In an exemplary home application scenario, a low-cost and flexible networking is supported to interconnect wireless digital consumer devices. Such devices can for example be multimedia devices which typically require high bit rates and are therefore using a lot of the available amount of bandwidth of a wireless ad hoc network.

The ETSI (European Telecommunications Standards Institute) Project BRAN (Broadband Radio Access Networks) has defined the standard HIPERLAN/2 (High Performance Radio Local Area Network), which provides high-speed multimedia communications between different broadband core networks and wireless (mobile) terminals. HIPERLAN/2 provides a flexible platform for a variety of business and home applications that can support a set of bit rates up to 54 Mbit/s The HIPERLAN/2 standard is an example how data can be transmitted between different devices in a wireless ad hoc network. Another standardization body for wireless ad hoc networks is IEEE 802.11. The invention is not limited to wireless networks according to the HIPERLAN/2 and IEEE 802.11 standard, though.

A problem occurs within a state of the art wireless ad hoc network, if a wireless terminal requests more bandwidth than the left amount of bandwidth, of the wireless ad hoc network. The terminal may request more bandwidth e.g. because it wants to setup a new wireless connection or requires more bandwidth for an existing wireless connection with another wireless terminal of the network. More bandwidth may also be required if a new wireless terminal wants to join the wireless ad hoc network and wants to set up wireless connections. In such a case, if the wireless ad hoc network runs according to the above mentioned HIPERLAN/2 standard or IEEE 802.11 standard, a wireless terminal may not be provided with the requested amount of bandwidth. Therefore, a certain user application may not be possible.

Figure 1:
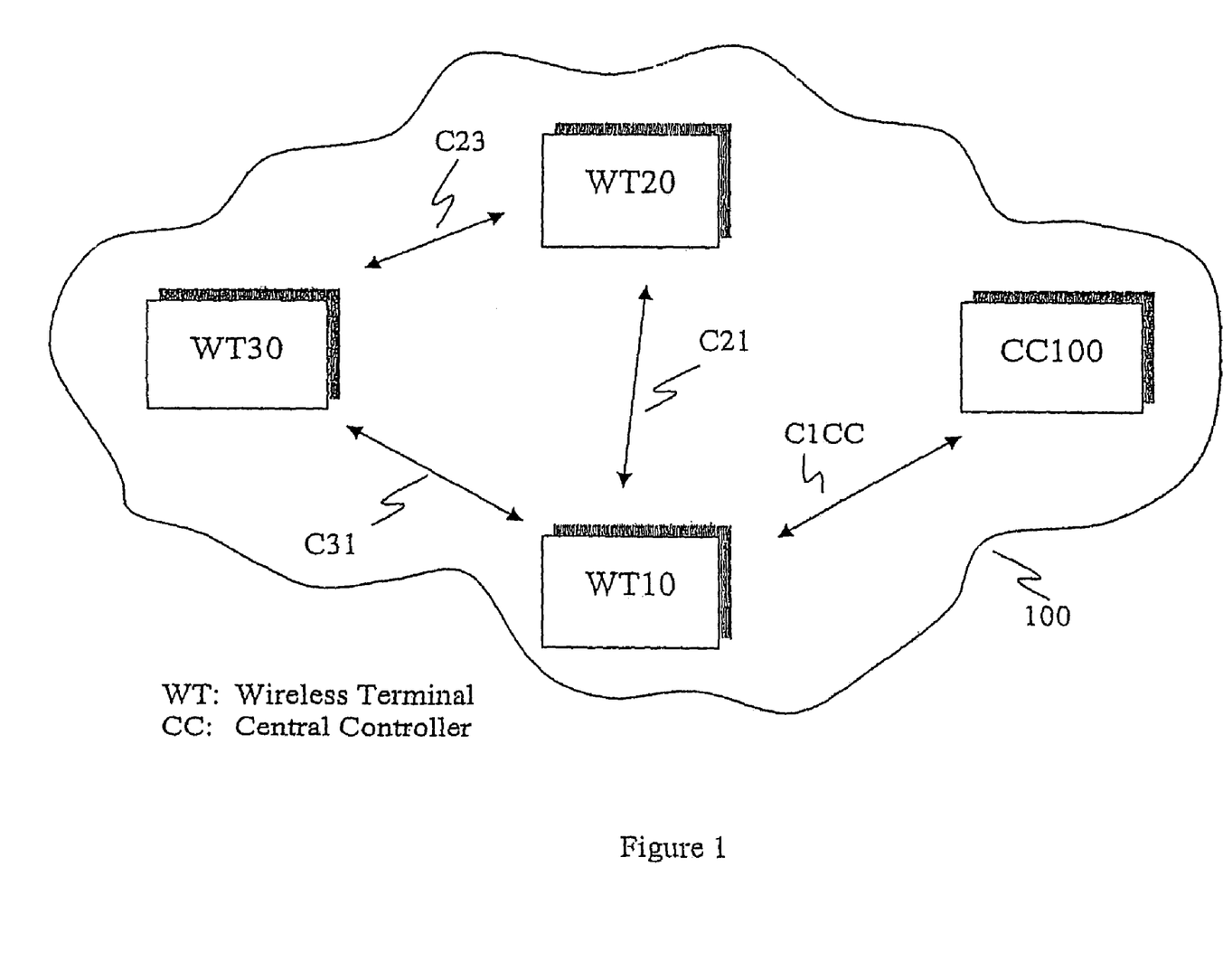
FIG. 1 shows an example of a state of the art wireless ad hoc network where the setup of a new connection fails because there is not enough available bandwidth to establish the connection.

FIG. 1 shows a state of the art wireless ad hoc network 100 comprising three wireless terminal-devices, i.e. a first wireless terminal-device WT10, a second wireless terminal-device WT20, and a third wireless terminal-device WT30, and a terminal-device central controller CC100 that controls the wireless terminal-devices. Further, there are three wireless device-connections, a first wireless device-connection C23 between the second wireless terminal-device WT20 and the third wireless terminal-device WT30, a second wireless device-connection C31 between the first wireless terminal-device WT10 and the third wireless terminal-device WT30 and a third device-connection C1CC between the first wireless terminal-device WT10 and the terminal-device central controller CC100. The wireless device-connections require a certain amount of the available bandwidth of the wireless ad hoc network 100. In the example the first wireless device-terminal WT10 wants to establish a new wireless device-connection C21 with the second wireless terminal-device WT20. However, the required bandwidth for this new wireless device-connection C21 exceeds the left amount of bandwidth of the total available bandwidth of the wireless ad hoc network. Therefore, in the state of the art wireless ad hoc network 100, if the network is operated according to HIPERLAN/2 standard, the setup of the new wireless device-connection C21 fails, or, if the network is operated according to IEEE 802.11 standard, an application on the new wireless device-connection C21 is not possible. A similar situation would occur if more bandwidth would be required for an existing wireless device-connection and the required amount of bandwidth exceeds the left available bandwidth of the wireless ad hoc network. If for example the second wireless terminal-device WT20 requires more bandwidth for the first wireless device-connection C23 and the required amount of bandwidth exceeds the left amount of the total available bandwidth, an application may not be possible. Moreover, data packets transmitted within the wireless ad hoc network may get lost.

Therefore, it is an object of the invention to provide a method and means for providing additional bandwidth for a wireless ad hoc network in case the amount of bandwidth of the wireless ad hoc network is not sufficient to establish new wireless connections or to provide more bandwidth for existing wireless connections.

The object of the invention is solved by a method for providing additional bandwidth for a wireless ad hoc network according to claim 1, by a wireless terminal according to claim 7, by a central controller according to claim 9, and by a wireless ad hoc network according to claim 11. Preferred embodiments thereof are respectively defined in the respective following subclaims.

The method to provide additional bandwidth for a wireless ad hoc network comprising a plurality of wireless terminals operating in a certain communication channel, (e.g. a RF channel at a certain frequency, an IR or optic channel) with a certain amount of available bandwidth according to the present invention comprises a step of splitting said wireless ad hoc network such that at least one new wireless ad hoc network is spawned, if more bandwidth than said certain amount of available bandwidth is required by said plurality of wireless terminals, wherein after the split of said wireless ad hoc network at least one wireless terminal of said wireless ad hoc network and/or one or more new wireless terminals belong(s) to said at least one new wireless ad hoc network, and said at least one new wireless ad hoc network is operating in a respective different communication channel.

In other words, if a first wireless ad hoc network requires more bandwidth, a second (new) wireless ad hoc network is spawned (generated). This second wireless ad hoc network is operated in a different communication channel than the first wireless ad hoc network, therefore providing additional bandwidth. Wireless terminals of the first wireless ad hoc network or new wireless terminals may be moved to the second wireless ad hoc network. It may also be possible, that new wireless terminals are moved to the first wireless ad hoc network and wireless terminals of the first wireless ad hoc network are moved to the second wireless ad hoc network. The splitting of a wireless ad hoc network (spawning of a new wireless ad hoc network) can also be seen as a bandwidth oriented reconfiguration of a wireless ad hoc network.

The wireless terminal of a wireless ad hoc network controlled by a central controller of said wireless ad hoc network according to the present invention comprises a receiving means adapted to receive a requesting command (SPAWN_NETWORK) from the central controller of the wireless ad hoc network, i.e. the first wireless ad hoc network, indicating certain operating conditions for the wireless terminal, a condition checking means to check if the wireless terminal can be operated under said certain conditions, and a sending means that sends out a confirmation command (SPAWN_NETWORK_ACK), if the condition checking means determines that the wireless terminal can be operated under said certain conditions, i.e. in the new (second) wireless ad hoc network.

The central controller of a (first) wireless ad hoc network comprising a plurality of wireless terminals according to the present invention comprises a splitting means that controls the splitting of said (first) wireless ad hoc network, wherein a new (second) wireless ad hoc network is spawned that comprises at least one of said plurality of wireless terminals and/or one or more new wireless terminals.

The wireless ad hoc network according to the present invention comprises a plurality of wireless terminals according to the present invention and a central controller according to the present invention.

Preferably, said (first) wireless ad hoc network and the splitting of said wireless ad hoc network are controlled by a central controller of said (first) wireless ad hoc network that decides which wireless terminals of said first) wireless ad hoc network and/or which new wireless terminals are moved to said at least one new wireless ad hoc network (second wireless ad hoc network), wherein the decision is based on certain separation criteria, and said central controller determines a new central controller for said at least one new wireless ad hoc network (second wireless ad hoc network).

Further, said (first) wireless ad hoc network and said at least one new wireless ad hoc network (second wireless ad hoc network) might be operated according to the IEEE802.11 or ETSI BRAN HIPERLAN/2 standard.

It is further advantageous, if said certain separation criteria assure that wireless terminals that have the same convergence layers, and/or are of the same application layer, and/or have the same connection, and/or provide the same or corresponding functions are not separated into different wireless ad hoc networks.

Preferably, said certain separation criteria further assure that wireless terminals with certain connections that should not be interrupted are not moved to said at least one new wireless ad hoc network.

Further, the invention provides advantageous new commands in order to spawn said at least one new wireless ad hoc network (second wireless ad hoc network), i.e. a requesting command (SPAWN_NETWORK) that is sent to a request wireless terminal to ask this request wireless terminal to move to said at least one new ad hoc wireless network (second wireless ad hoc network), and a confirmation command (SPAWN_NETWORK_ACK) that is used by a request wireless terminal to signal that it can move to said at least one new ad hoc wireless network (second wireless ad hoc network).

Preferably, said certain conditions define if said request wireless terminal can operate as a central controller of a wireless ad hoc network, if said request wireless terminal can operate in a certain communication channel, and a moment in time at which said request wireless terminal should operate in said certain communication channel.

Further, advantageously a wireless terminal stops using its entire wireless connections (radio link control—RLC) the moment it sent out said confirmation command (SPAWN_NETWORK_ACK), moves to one of said at least one new wireless ad hoc network, waits until it receives a start command (RLC_CC_START_OPERATION) sent out by a central controller, and then starts using its wireless connections according to the information (e.g. time stamp) provided by said start command (RLC_CC_START_OPERATION). It may also be possible that within said requesting command (SPAWN_NETWORK) a time stamp is transmitted and a wireless terminal stops its entire connections at the moment in time indicated by this time stamp. Thus, all wireless terminals that are moved to said at least one new wireless ad hoc network (second ad hoc wireless network) stop their radio link control at the same time.

The invention and advantageous details thereof will be explained by way of an exemplary embodiment thereof in the following with reference to the accompanying drawings in which.

Figure 2A:
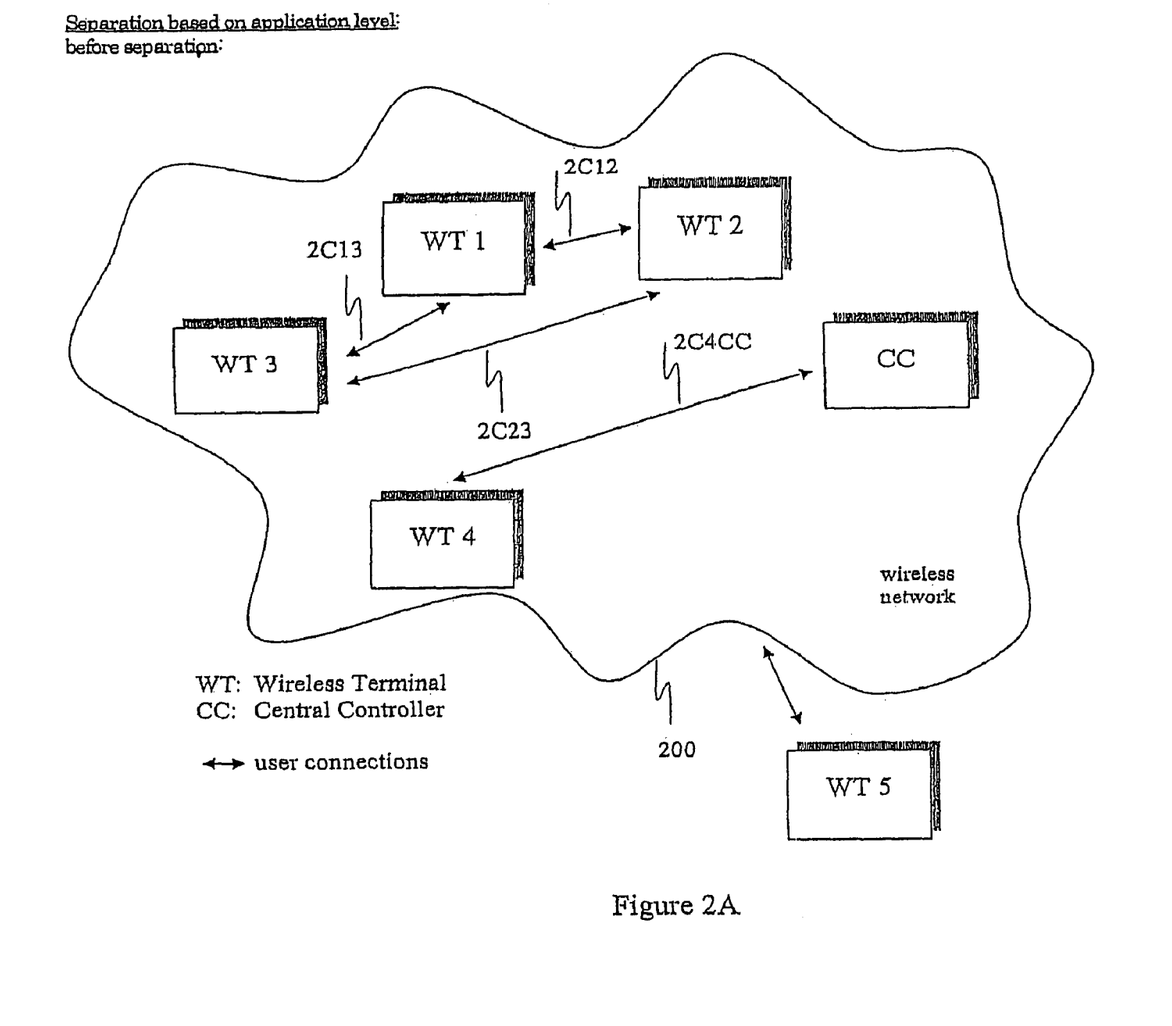
FIG. 2A shows an example of a wireless ad hoc network with different user connections wherein a wireless terminal requires more bandwidth and a wireless terminal wants to join the network.
Figure 2B:
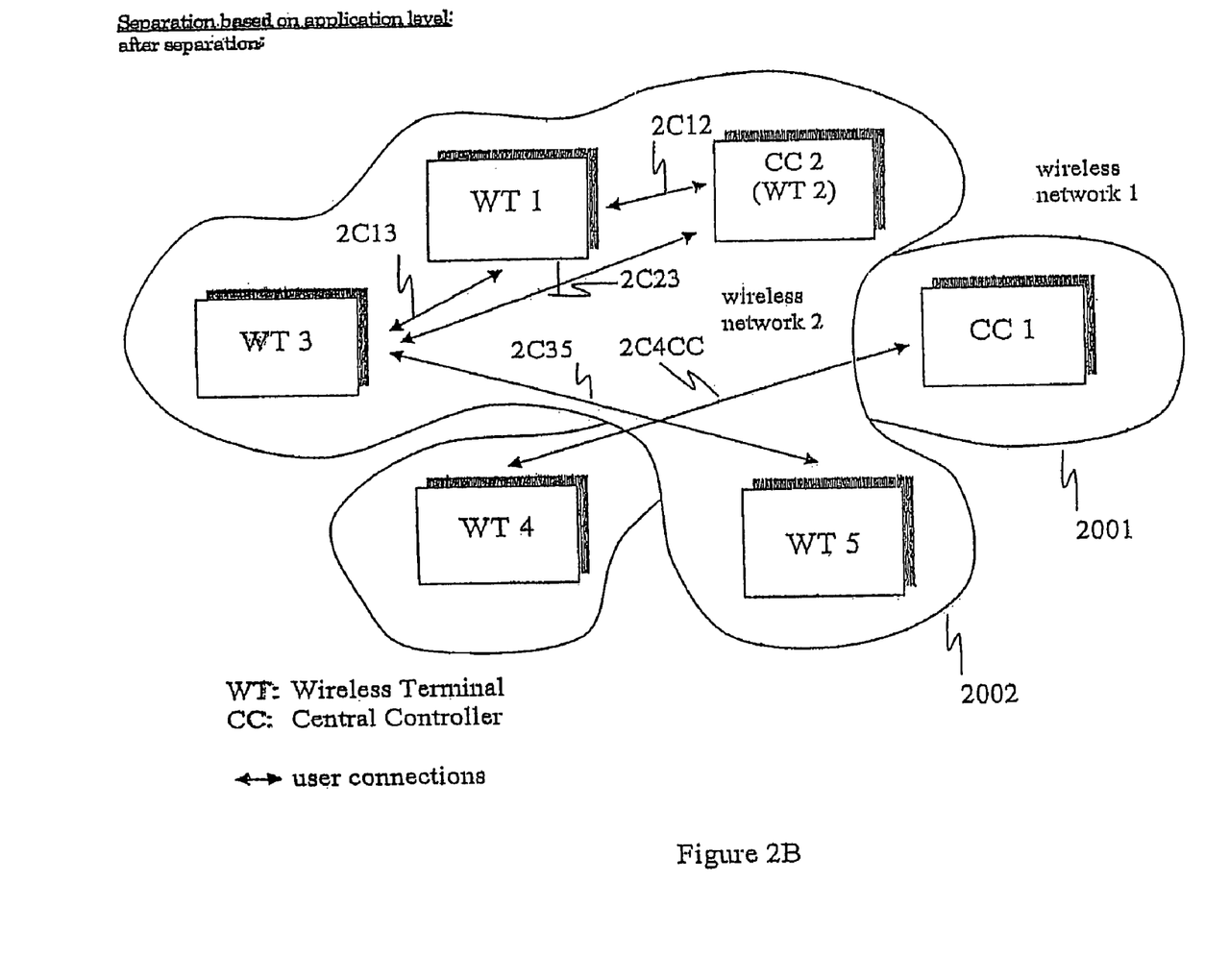
FIG. 2B shows the splitting based on application level of the wireless ad hoc network of FIG. 2A according to the invention to provide more band width.

FIGS. 2A and 2B show an example of a wireless ad hoc network according to the invention. In FIG. 2A, the first original wireless network 200 comprises four wireless terminals, i.e. a first wireless terminal WT1, a second wireless terminal WT2, a third wireless terminal WT3, and a fourth wireless terminal WT4, and a central controller CC. There are three wireless connections (user connections), i.e. a first wireless connection 2C13 (connecting the first wireless terminal WT1 and the third wireless terminal WT3), a second wireless connection 2C12 (connecting the first wireless terminal WT1 and the second wireless terminal WT2), and a third wireless connection 2C4CC (connecting the fourth wireless terminal WT4 and the central controller CC). In the example, the second wireless terminal WT2 requests the setup of a fourth wireless connection 2C23 with the third wireless terminal WT3 requiring a certain amount of bandwidth. Further, a fifth wireless terminal WT5 wants to join the first original wireless network 200 requesting a fifth wireless connection 2C35 with the third wireless terminal WT3 requiring a certain amount bandwidth. The central controller CC therefore checks, if all conditions for establishing the new connections, i.e. the fourth wireless connection 2C23 and the fifth wireless connection 2C35, are met, i.e. especially the central controller CC checks, if there is enough bandwidth available. In the example, there is not enough bandwidth available to establish the new connections. If the network would run according to state of the art HIPERLAN/2 standard the required connections could not be established, or if the network would run according to IEEE 802.11 standard a desired user application would not be possible.

As can be seen in FIG. 2B, according to the invention, the first original wireless ad hoc network 200 is split up into two wireless ad hoc networks such that a first new wireless ad hoc network is spawned. In FIG. 2B, wireless ad hoc network 2001 corresponds to the first original wireless ad hoc network 200 of FIG. 2A, further, a first new wireless ad hoc network 2002 can be seen. Each wireless ad hoc network operates in a different RF channel. It should be mentioned, that the invention is not limited to RF channels. It may be used for a variety of different communication channels, e.g. IR or other optic channels. If the RF channels of the wireless ad hoc network 2001 and the first new wireless ad hoc network 2002 have the same available amount of bandwidth, the total amount of bandwidth available for the wireless terminals is doubled in comparison to the first original wireless ad hoc network 200 of FIG. 2A. Here, the wireless ad hoc network 2001 operates in the same RF channel as the wireless ad hoc network 200. However, it is also possible, that the RF channel of wireless ad hoc network 2001 is changed, wherein the channel is different from that of the first new wireless ad hoc network 2002.

As can be seen in FIG. 2B, each wireless ad hoc network, i.e. wireless network 2001 and the first new wireless ad hoc network 2002, has a central controller. Wireless ad hoc network 2001 has a first central controller CC1 and wireless ad hoc network 2002 has a second central controller CC2. The first central controller CC1 is the original central controller CC of the first original wireless ad hoc network 200 of FIG. 2A. The second central controller CC2 is the original second wireless terminal WT2 of FIG. 2A, i.e. the second wireless terminal WT2 now has additional controlling functions to function as the second central controller CC2 of the first new wireless ad hoc network 2002.

A wireless terminal can function as a central controller. In this case the wireless terminal performs additional controlling functions. That means, a central controller can be seen as a wireless terminal with additional controlling functions. Controlling functions include the management of the network and its connections, for example the association of new wireless terminals. However, there may also be some wireless terminals that are not capable of performing addition controlling functions, i.e. they cannot be used as central controllers. If a network is split up the new central controller of the new wireless ad hoc network can therefore only be a wireless terminal with additional controlling functions. The original central controller can assign the new central controller, since the capabilities of the different wireless terminals with respect to the controlling functions are exchanged during the association process, i.e. the log-in of a wireless terminal to a network.

In FIG. 2B wireless ad hoc network 2001 comprises the fourth wireless terminal WT4 and the second central controller CC2. The second central controller CC2 is the central controller CC of the first original wireless ad hoc network 200 of FIG. 2A. Further, the wireless network 2001 comprises the third wireless connection 2C4CC between the fourth wireless terminal WT4 and the second central controller CC2.

In the following description, if the reference symbol of a wireless terminal central controller, and/or a connection changes due to a split of a network, the corresponding reference symbol before the split will be given in parenthesis, e.g. the second central controller CC2 in FIG. 2B will be written as second central controller CC2 (CC).

In FIG. 2B the first new wireless ad hoc network 2002 comprises the first wireless terminal WT1, the third wireless terminal WT3, the fifth wireless terminal WT5 and the second central controller CC2 (WT2), which is the second wireless terminal WT2 of the first original wireless network 200 of FIG. 2A now functioning as a central controller. Further, the first new wireless network 2002 comprises the first wireless connection 2C13, the second wireless connection 2C12, the fourth wireless connection 2C23, and the fifth wireless connection 2C35. The fifth wireless connection 2C35 between the third wireless terminal WT3 and the fifth WT5 and the fourth wireless connection 2C23 between the second wireless terminal WT2 and the third wireless terminal WT3 are the requested connections that can now be established because there is now enough bandwidth available due to the splitting of the first original wireless network 200 of FIG. 2A In the example of FIG. 2B the criteria used for separating (splitting), i.e. the decision which wireless terminals are placed in which wireless network, is based on the functionality of the different wireless terminals (functional or application level based separation). Examples for different functionalities of wireless terminals are video communication and audio communication on the one hand, and data transfer (PC to PC data communication) on the other hand. In the example of FIGS. 2A and 2B, the first wireless terminal WT1, the second wireless terminal WT2, the third wireless terminal WT3 and the fifth wireless terminal WT5 are PC-type devices. The fourth wireless terminal WT4 and the first central controller CC1 are video and audio devices (VCR, TV, loudspeaker, . . . ). Therefore, the video and audio devices, i.e. the fourth wireless terminal WT4 and the first central controller CC are left in wireless ad hoc network 2001 and the PC-type devices, i.e. the first wireless terminal WT1, the second wireless terminal WT2 the third wireless terminal WT3 and the fifth wireless terminal WT5 are put into the first new wireless ad hoc network 2002. There is no connection between wireless ad hoc network 2001 and the first new wireless ad hoc network 2002.

There may be other criteria according to which wireless terminals should be separated during the splitting process. Examples for such criteria are:

Connection type (supported convergence layers). In HIPERLAN/2 it is possible to have multiple convergence layers (e.g. Ethernet, IEEE 1394) in parallel on top of one wireless connection. It may be important not to separate wireless terminals connected by a wireless connection with the same convergence layer.

Application layer specific criteria. In IEEE 802.11 and HIPERLAN/2 standard, an application layer may have specific requirements, e.g. communication on specific port numbers, applications, or protocols. These may be criteria to perform network separation, e.g. wireless terminals with application layers communicating on the same port number should not be separated.

Communication on the same connection. It may be important not to separate wireless terminals that are communicating on the same connection(s).

Functionality of devices (e.g. in IEEE 1394: Video devices, Audio devices, . . . ). It may be important that devices that can potentially communicate with each other are not separated. For example a video out putting device should maybe not separated from a video reproducing device (cf. example of FIG. 2B).

Another separation criterion may be the interruption of connections. During the move of a wireless terminal to a new (spawned) wireless ad hoc network, the transfer of data may not be possible for a short moment. If the wireless terminal has an application requiring a certain quality of service, e.g. for a real time application, it should therefore eventually not be moved to the new wireless ad hoc network. If such a wire less terminal stays in the original wireless ad hoc network, the data transfer may not be interrupted, i.e. the quality of service can be assured even during a split of a network.

Figure 3:
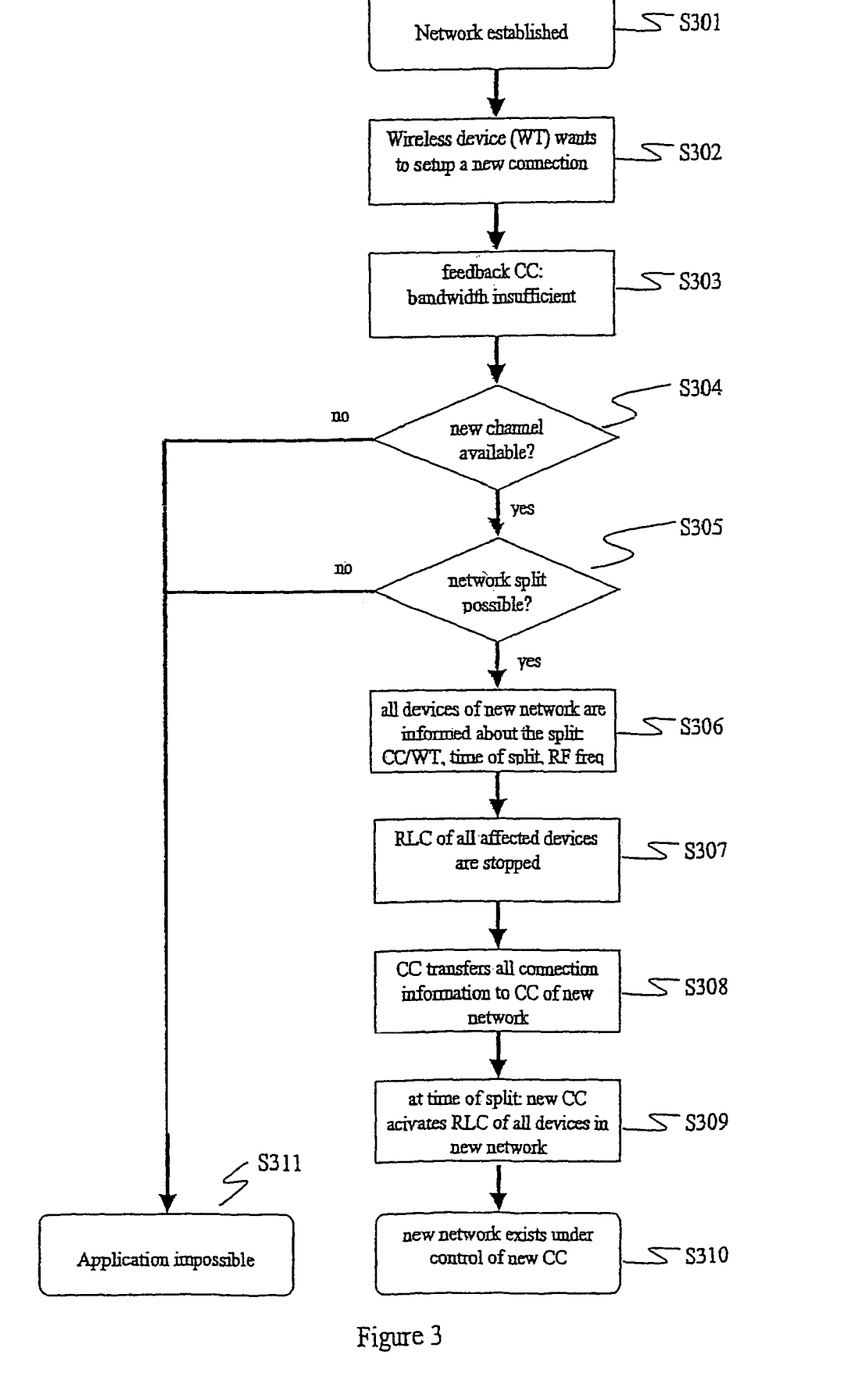
FIG. 3 shows a flow chart illustrating the process of splitting a wireless ad hoc network.

FIG. 3 shows a flow chart illustrating the process of splitting a wireless ad hoc network. In the original state S301 a wireless ad hoc network is established. In a following step S302 a wireless device (wireless terminal, WT) wants to set up a new connection. The wireless device therefore informs the central controller of the wireless ad hoc network about this desire to set up a new connection.

In the next step S303 the wireless terminal that wants to setup a new connection gets the feedback from the central controller that the left amount of bandwidth is insufficient to establish the new connection. The central controller therefore checks thereafter in step S304 if another channel is available. If this is not the case, the first final state S311 is reached which indicates that the application is not possible.

If another channel is available, in step S305, the central controller checks if a network split is possible. Therefore, it is checked which devices of the network need to remain in the same wireless ad hoc network and which can be moved to the new wireless network. This means the above mentioned criteria are checked and two sets of wireless terminals a are formed such that wireless terminals that cannot be separated according to the respective criteria are kept within the same set, i.e. the same wireless network. It is then determined which wireless terminals are separated from the wireless ad hoc, network to form a new wireless ad hoc network. (In the following these wireless terminals are referred to as splitting wireless terminals). If a network split is not possible, the first final state S311 is reached, i.e. the application is not possible. If, however, in step S305, the central controller determines that a network split is possible, in step 306, all splitting wireless terminals are informed about the split. The splitting wireless terminals are provided, with the following information.

Each splitting wireless terminal is informed whether its role in the new wireless ad hoc network is the role of a regular wireless terminal or the role of the central controller of the new network.

The splitting devices are also informed about the splitting time, i.e. the moment in time at which the split of the network will be performed.

Further, the RF frequency of the new wireless ad hoc network is transmitted to the splitting device such that a splitting device may restart its wireless connections after the split at the indicated frequency.

In a following step S307 the radio link control (RLC) of all affected devices, i.e. all splitting devices, is stopped.

Thereafter, in step S308 the central controller then transfers all connection information to the central controller of the new wireless ad hoc network, and the new central controller of the new wireless ad hoc network activates the RLC of all devices in the new network at the splitting time in step S309. In a second final state S310 there then exists a new wireless ad hoc network under control of the new central controller. In parallel there exists a wireless network (original wireless ad hoc network) that comprises all wireless terminals that have not been moved to the new wireless ad hoc network and the original central controller. It may also comprise new wireless terminals.

Figure 4:
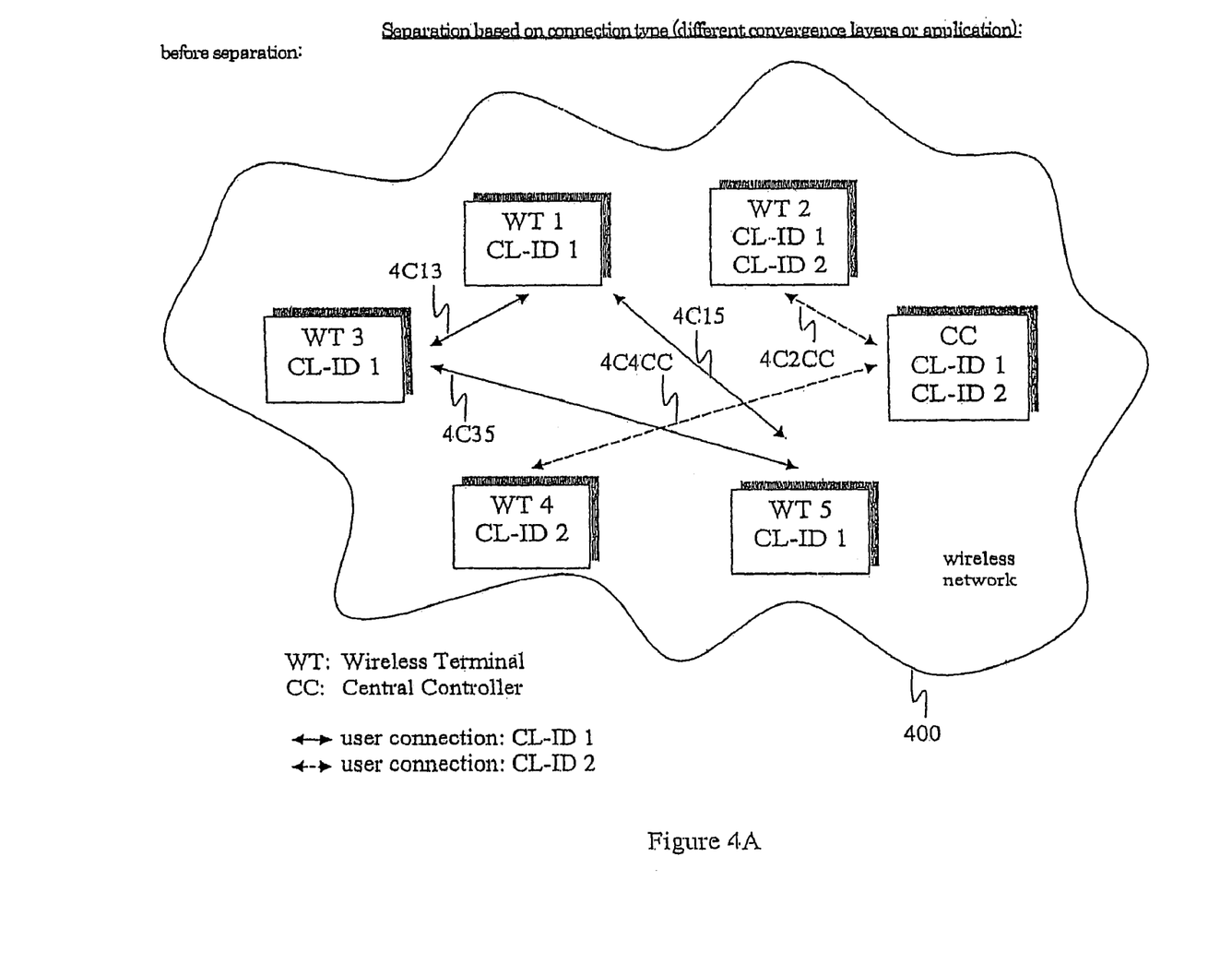
FIG. 4A shows an example of a wireless ad hoc network with wireless connections with different convergence layers, i.e. different connection types, wherein a wireless terminal requires more bandwidth to set up a new wireless connection.
FIG. 4B shows the splitting based on connection type of the wireless ad hoc network of FIG. 4A according to the invention to provide more band width.
Figure 4B:
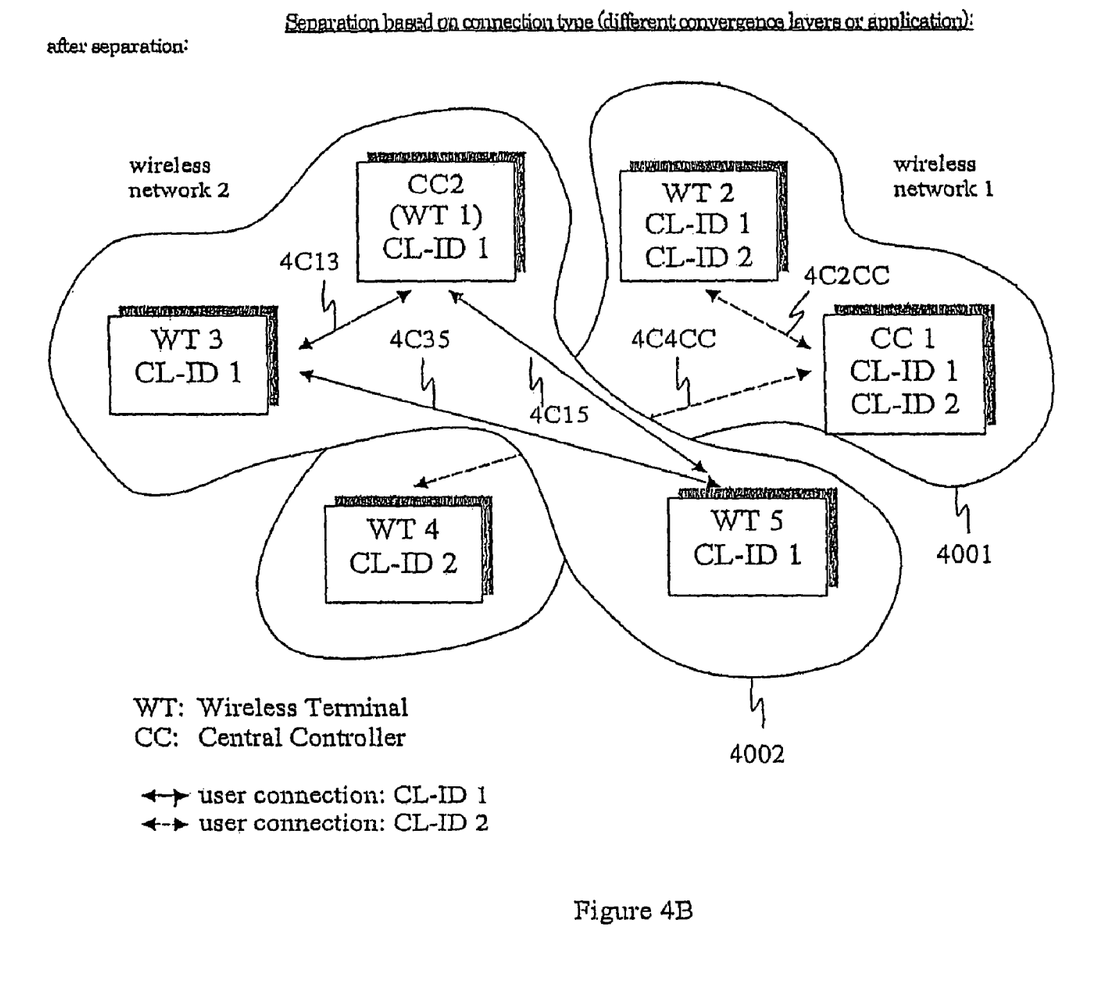

FIGS. 4A and 4B show another example of a wireless ad hoc network that is split up according to the invention. Here, the separation of wireless terminals is based on the connection type of the different wireless terminals, i.e. wireless terminals with the same connection type are preferably not separated into different ad hoc networks. In the example here, a connection type refers to a convergence layer in the sense of the HIPERLAN/2 standard. This means, wireless terminals with the same convergence layers are not separated. As mentioned above in HIPERLAN/2 networks, it is possible to have different convergence layers (CL) on top of the data link control (DLC) layers and physical (PHY) layers. Specific convergence layers can be for example Ethernet, IEEE1394, IP, ATM, or UMTS. This makes HIPERLAN/2 a multi-network air interface. There may be exceptions, i.e. it may be possible that wireless terminals with the same connection type are admitted to be separated. An exception is made, if the wireless terminals are not communicating with each other, i.e. they have no connections with each other.

FIG. 4A shows a second original wireless ad hoc network 400 before the separation according to the invention. It comprises the first wireless terminal WT1, the second wireless terminal WT2, the third wireless terminal WT3, the fourth wireless terminal WT4, and the fifth wireless terminal WT5, and the central controller CC. Further, it comprise a sixth wireless connection 4C13, a seventh wireless connection 4C2CC, an eighth wireless connection 4C35, and a ninth, wireless connection 4C4CC. The first wireless terminal WT1, the third wireless terminal WT3, and the fifth wireless terminal WT5 have wireless connections with the same first convergence layer CL-ID1, i.e. the sixth wireless connection 4C13 and the eighth wireless connection 4C35 have the first convergence layer CL-ID1. The fourth wireless terminal WT4 has a wireless connection with a different convergence layer, i.e. a second convergence layer CL-ID2. The second wireless terminal WT2 and the central controller CC have the seventh wireless connection 4C2CC with both convergence layers, i.e. the first convergence layer CL-ID1 and the second convergence layer CL-ID2. Now, the first wireless terminal WT1 wants to setup a tenth wireless connection 4C15 with the first convergence layer CL-ID1 with the fifth wireless terminal WT5 requiring a certain amount of bandwidth. However, the left amount of bandwidth within the wireless network is not sufficient. Therefore, according to the invention, the network is split up, i.e. a new wireless ad hoc network is spawned. It should be mentioned again, that if the network would run according to state of the art HIPERLAN/2 standard the setup of the tenth wireless connection 4C15 would fail, or if the network would run according to IEEE802.11 standard, an application would not be possible.

The central controller CC now determines, which wireless terminals are moved to the second new wireless ad hoc network and which remain in the second original network. The two separated wireless networks can be seen in FIG. 4B. The wireless ad hoc network 4001 in FIG. 4B corresponds to the second original wireless ad hoc network 400 of FIG. 4A, further a second new wireless ad hoc network 4002 is spawned during the splitting process. As mentioned above, in the example of FIGS. 4A and 4B, the separation of wireless terminals is based on connection type, i.e. on the respective convergence layers. Since the first wireless terminal WT1, the third wireless terminal WT3, and the fifth wireless terminal WT5 are communicating over wireless connections with the same first convergence layer CL-ID1, these wireless terminals are not separated. Further, the second wireless terminal WT2, the fourth wireless terminal WT4 and the central controller CC have connections with each other with the second convergence layer CL-ID2 and are therefore not separated. As mentioned above the second wireless terminal WT2 and the central controller CC additionally have the second convergence layer CL-ID1 on top of the seventh wireless connection 4C2CC. However, they have no connection with the first wireless terminal WT1, the third wireless terminal WT3, and the fifth wireless terminal WT5 and can therefore be separated from these wireless terminals.

As can be seen in FIG. 4B, the tenth wireless connection 4C15 between the fifth wireless terminal WT5 and the second new central controller CC22 (WT1) could now be established because of the split of the network there is now enough bandwidth available. The second new central controller CC2 is the original first wireless terminal WT1 of the second original wireless network in FIG. 4A.

Figure 5:
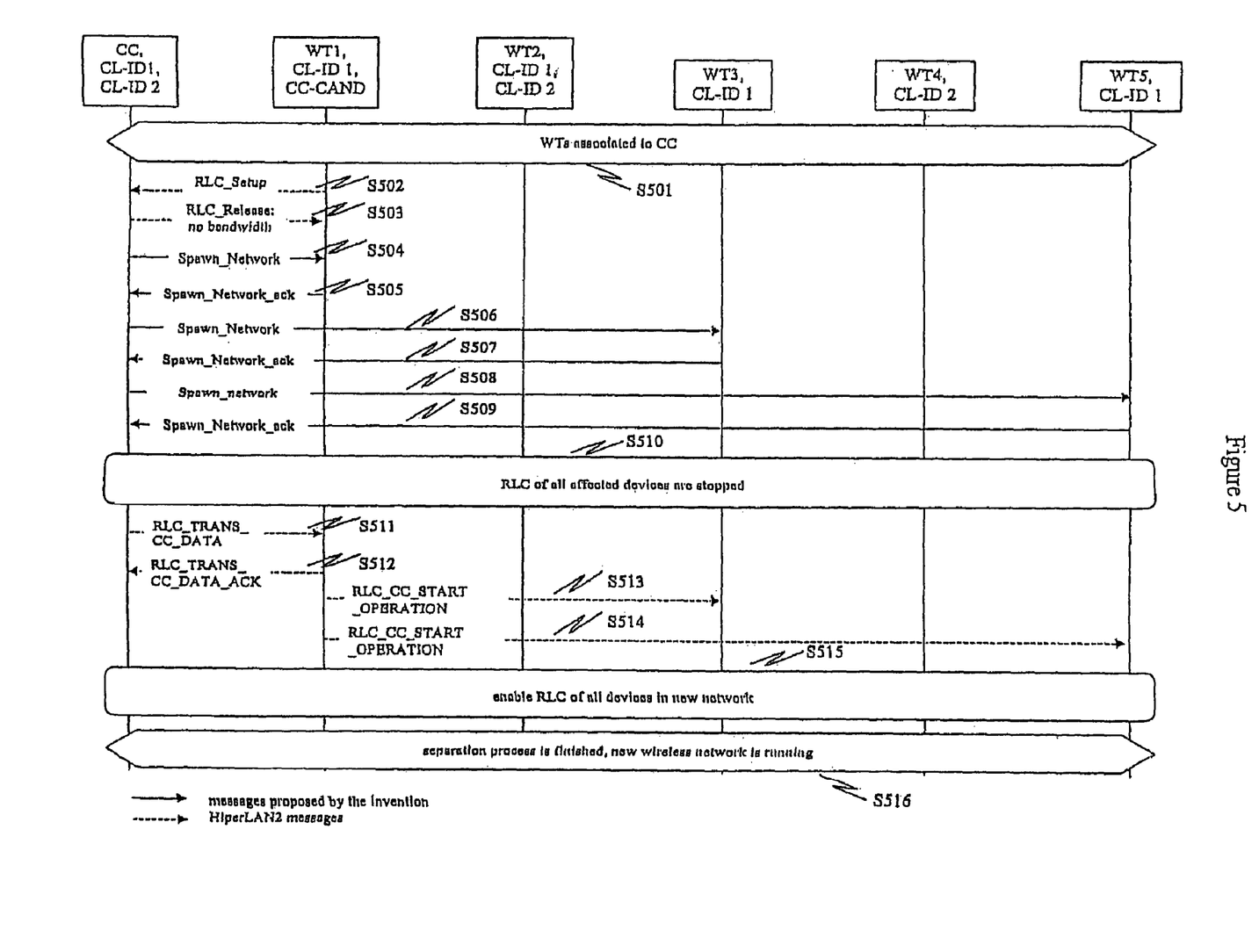
FIG. 5 shows a message sequence chart (MSC) for the ETSI BRAN HIPERLAN/2 standard that describes the process of splitting the wireless ad hoc network of FIGS. 4A and 4B, wherein new commands according to the invention are used.

FIG. 5 shows a message sequence chart (MSC) for the ETSI BRAN HIPERLAN/2 standard for the separation (splitting) process according to the invention. The MSC in FIG. 5 describes the separation process of the wireless ad hoc network in FIGS. 4A and 4B. The MSC in FIG. 5 shows the first wireless terminal WT1, the second wireless terminal WT2, the third wireless terminal WT3, the fourth wireless terminal WT4, the fifth wireless terminal WT5, and the central controller CC of the second original wireless ad hoc network 400 of FIG. 4A.

In the initial state S501 the first wireless terminal WT1, the second wireless terminal WT2, the third wireless terminal WT3, the fourth wireless terminal WT4, and the fifth wireless terminal WT5 are associated to the central controller CC as shown in FIG. 4A. As mentioned above the first wireless terminal WT1 now requires more bandwidth to set up the tenth wireless connection 4C15 with the fifth wireless terminal WT5. Therefore, in step S502, the first wireless terminal WT1 sends the standard HIPERLAN/2 message "RLC_Setup" to the central controller CC indicating the required setup of the new connection requiring more bandwidth. In the following step S503, the central controller CC sends back the HIPERLAN/2 standard command "RLC_Release: lack of resources" to the first wireless terminal WT1 indicating that no bandwidth is available to set up a new connection with the required amount of bandwidth. The lack of bandwidth causes the central controller CC to check if parts of the network can be separated to a new network. This means the above mentioned criteria are checked. In the present example the criteria for the separation are the convergence layers of the wireless terminals associated to the central controller CC. As explained above with reference to the FIGS. 4A and 4B, the first wireless terminal WT1, the third wireless terminal WT3, and the fifth wireless terminal WT5 have the same convergence layers and are therefore not separated and the second wireless terminal WT2, the fourth wireless terminal WT4, and the central controller CC are not separated.

Once, the central controller CC has determined that a split is possible and which wireless terminals are moved to the new wireless ad hoc networks (splitting wireless terminals), the central controller CC sends a command "Spawn_Network" to the splitting wireless terminals, here, the first wireless terminal WT1, the third wireless terminal WT3, and the fifth wireless terminal WT5. The command "Spawn_Network" is defined as follows:

Spawn Network
  functionality: a central controller (CC) informs wireless terminals (WTs) to change to a new wireless network
  parameters:
    channel center frequency of the new network defines
    CC_or_MT role of the device in the new network (wireless terminal or new central controller)
    start_mac_frame defines point of time when devices belong to new network and are controlled by the new central controller CC.

A wireless terminal that receives a command "Spawn_Network" from a central controller sends back a command "Spawn_Network_ack" to the central controller indicating whether it can change to the new network or not. The command "Spawn_Network_ack" is defined as follows:

Spawn Network Ack
  functionality: wireless terminals acknowledge SPAWN_NETWORK command
  parameters:
    ACCEPT_ACTION indicates if the wireless terminal can change to the new network or rejects the separation. The rejection lets the central controller look for new separation possibilities or cancel the separation process.

As soon as a command "Spawn_Network_ack" is sent out by a wireless terminal indicating that the wireless terminal can change to a new network (the parameter ACCEPT_ACTION is set accordingly), the wireless terminal stops its radio link control (RLC). When the time indicated by the command "start_mac_frame" arrives, the wireless terminal moves to the new network, i.e. it sets all its parameters (e.g. frequency) according to the values indicated by the command "SPAWN_NETWORK". It then waits for a wake-up command "RLC_CC_START_OPERATION" sent out by the new central controller of the new wireless ad hoc network to actually starts its RLC.

Now, in the example of FIG. 5, in step S504, the command "Spawn_Network" is sent to the first wireless terminal WT1. Since the first wireless terminal WT1 will become the second new central controller CC2, it is the designated central controller CC-CAND (central controller candidate) of the new wireless ad hoc network. Therefore, the parameter "CC_or_MT" of the command "Spawn_Network" indicates that the first wireless terminnal WT1 becomes a central controller. In the following step S505 the first wireless terminal WT1 sends back the command "Spawn_Network_ack" to the central controller CC indicating that it can change to the new network and can be the central controller of the new network. Then, in step S506, the central controller sends the command "Spawn_Network" to the third wireless terminal WT3. Within this Spawn_Network command the parameter "CC_or_MT" indicates that the third wireless terminal WT3 remains a wireless terminal, i.e. does not become a central controller. Then, in step S507, the third wireless terminal WT3 sends back a command "Spawn_Network_ack" to the central controller CC indicating that it can change to the new network. In the following step, i.e. step S508, the central controller CC sends the command "Spawn_Network" to the fifth wireless terminal WT5. The parameter "CC_or_MT" again indicates that the fifth wireless terminal WT5 remains a wireless terminal in the new network. The fifth wireless terminal WT5 sends back the command "Spawn_Network_ack" in step S509 to the central controller CC indicating that it can change to the new network.

As mentioned above, when a wireless terminal sends out a command "Spawn_Network_ack" it stops its RLC. Therefore, in the respective steps S505, S507, and S509 the first wireless terminal WT1, the third wireless terminal WT3, and the fifth wireless terminal WT5 stopped their RLC. Therefore, in the internal state S510 the RLC of the affected devices, i.e. the first wireless terminal WT1, the third wireless terminal WT3, and the fifth wireless terminal WT5 are stopped.

Thereafter, in step S511, the central controller CC sends out the HIPERLAN/2 standard command "RLC_TRANS_C-C_DATA" to the central controller candidate CC-CAND of the second new wireless ad hoc network (the first wireless terminal WT1). With this command the central controller CC transmits all connection-relevant data to the first wireless terminal WT1 (central controller candidate CC-CAND of the second new network). It is therefore possible to maintain all direct link connections that shall be moved to the new network without the need of a new setup procedure. After the central controller candidate CC-CAND of the new network, here the first wireless terminal WT1, is aware of all network-relevant data it sends the standard HIPERLAN/2 command "RLC_CC_START_OPERATION" to all wireless terminals of the new network. Besides other information within the command "RLC_CC_START_OPERATION" also a time stamp is transmitted indicating at which time the wireless terminal that receives the command may start its RLC. This way, all wireless terminals of the new network start their RLC at the same moment in time.

In the next step, i.e. in step S512, the central controller candidate CC-CAND (WT1) sends a command "RLC_TRANS_DATA_ACK" of the HIPERLAN/2 standard to the central controller to acknowledge the reception of the command "RLC_TRANS_CC_DATA".

In the following step S513, the central controller candidate CC_CAND (WT1) sends the HIPERLAN/2 standard command "RLC_CC_START_OPERATION" to the third wireless terminal WT3. In step 3514 the central controller candidate CC_CAND (WT1) then sends the HIPERLAN/2 standard command "RLC_CC_START_OPERATION" to the fifth wireless terminal WT5.

In step S515, when the time indicated by the time stamps of the commands "RLC_CC_START_OPERATION" transmitted to the third wireless terminal WT3 and the fifth wireless terminal WT5 in steps S513 and S514 arrives, the RLC of the third wireless terminal WT3 and the fifth wireless terminal WT5 and the RLC of the second new central controller CC2, i.e. CC-CAND (WT1), are enabled.

In the final state S516 the separation process is finished and the second new wireless ad hoc network is running as shown in FIG. 4B.

In the following the invention is summarized:

A first wireless ad hoc network with a certain available amount of bandwidth comprises a plurality of wireless terminals communicating via wireless connections with each other. Each wireless connection requires a certain amount of the available amount of bandwidth. A problem occurs, if a wireless terminal wants to set up a new wireless connection requiring bandwidth or requires more bandwidth for an existing wireless connection and the required amount of bandwidth exceeds the left amount of the available amount of bandwidth of the first wireless ad hoc network. In a state of the art wireless ad hoc network the requested bandwidth cannot be provided and a user application may not be possible. According to the invention, however, the required amount of bandwidth can be provided by splitting the first wireless ad hoc network such that a second wireless ad hoc network is spawned which operates in a different communication channel and thus provides additional bandwidth. The second wireless ad hoc network comprises wireless terminals of the first wireless ad hoc network and/or new wireless terminals.

The invention claimed is:

1. A method to provide additional bandwidth for a wireless ad hoc network configured to operate in a certain communication channel with a certain amount of available bandwidth comprising a plurality of wireless terminals, the method comprising:
   checking by a central controller of said wireless ad hoc network whether more bandwidth than said certain amount of available bandwidth is required by said plurality of wireless terminals;
   splitting up, via the central controller, said wireless ad hoc network into at least two wireless ad hoc networks such that at least one additional wireless ad hoc network is spawned, when more bandwidth than said certain amount of available bandwidth is required by said plurality of wireless terminals, and
   allocating, via the central controller, additional bandwidth to the wireless ad hoc network or to the at least one additional wireless ad hoc network, wherein
   after the splitting up of said wireless ad hoc network, at least one wireless terminal of said wireless ad hoc network and/or one or more new wireless terminals belong(s) to said at least one additional wireless ad hoc network,
   said at least one additional wireless ad hoc network is operating in a respective different communication channel, and
   wireless terminals of a respective wireless ad hoc network of the at least two wireless ad hoc networks communicate with the other wireless terminals of the respective ad hoc network in the respective different communication channels.

2. The method according to claim 1, further comprising:
   controlling said wireless ad hoc network and the splitting up of said wireless ad hoc network by said central controller of said wireless ad hoc network that decides which wireless terminals of said wireless ad hoc network and/or which new wireless terminals are moved to said at least one new wireless ad hoc network, wherein
   the decision is based on certain separation criteria, which said certain separation criteria assure that wireless terminals that have the same convergence layers, and/or are of the same application layer, and/or have the same connection, and/or provide the same or corresponding functions are not separated into different wireless ad hoc networks, and
   said central controller determines a new central controller for said at least one new wireless ad hoc network.

3. The method according to claim 1, further comprising:
   operating said wireless ad hoc network and said at least one new wireless ad hoc network according to the IEEE802.11 or ETSI BRAN HIPERLAN/2 standard.

4. The method according to claim 2, wherein said certain separation criteria assure that wireless terminals with certain connections that should not be interrupted are not moved to said at least one new wireless ad hoc network.

5. The method according to claim 1, further comprising:
   providing new commands in order to spawn said at least one new wireless ad hoc network, wherein
   a requesting command (SPAWN_NETWORK) is sent to a request wireless terminal to ask this request wireless terminal to move to said at least one new ad hoc wireless network, and
   a confirmation command (SPAWN_NETWORK_ACK) is used by a request wireless terminal to signal that it can move to said at least one new ad hoc wireless network.

6. The method according to claim 5, wherein a wireless terminal stops using its entire wireless connections the moment said terminal sent out said confirmation command (SPAWN_NETWORK_ACK), moves to one of said at least one new wireless ad hoc network, waits until said terminal receives a start command (RLC_CC_START_OPERATION) sent out by a central controller, and then starts using its wireless connections according to the information provided by said start command (RLC_CC_START_OPERATION).

7. A wireless terminal of a wireless ad hoc network controlled by a central controller of said wireless ad hoc network comprising:
- a receiving unit configured to receive a requesting command (SPAWN_NETWORK) from the central controller indicating certain operating conditions for the wireless terminal to move to a new ad hoc wireless network and to leave said wireless ad hoc network;
- a condition checking unit configured to check if the wireless terminal can be operated under said certain conditions; and
- a sending unit configured to send out a confirmation command (SPAWN_NETWORK_ACK), when the condition checking unit determines that the wireless terminal can be operated under said certain conditions to signal that the wireless terminal can move to said new wireless network, wherein
- the wireless terminal is configured to perform communication with other terminals of the wireless ad hoc network after receiving the requesting command (SPAWN_NETWORK) and to stop the communication with the other terminals of the wireless ad hoc network as soon as the confirmation command has been sent out.

8. The wireless terminal according to claim 7, wherein said certain conditions define if said wireless terminal can operate as a central controller of a wireless ad hoc network, a certain communication channel at which said wireless terminal is able to operate, and/or a moment in time at which said wireless terminal shall operate in said certain communication channel and at which it may be controlled by a different central controller.

9. A wireless ad hoc network, comprising:
- a plurality of wireless terminals according to claim 7; and
- a central controller including a splitting unit configured to control the splitting of said wireless ad hoc network, wherein a new wireless ad hoc network is spawned that includes at least one of said plurality of wireless terminals and/or one or more new wireless terminals, wherein
- the central controller is configured to check whether more bandwidth than a certain amount of available bandwidth is required by said plurality of wireless terminals.

10. A central controller of a wireless ad hoc network including a plurality of wireless terminals, comprising:
- a splitting unit to control the splitting of said wireless ad hoc network into at least two wireless ad hoc networks, wherein at least one additional wireless ad hoc network is spawned that includes at least one of said plurality of wireless terminals and/or one or more new wireless terminals, after the splitting up of said wireless ad hoc network, said at least one additional wireless ad hoc network operating in a respective different communication channel, wireless terminals of a respective wireless ad hoc network of the at least two wireless ad hoc networks communicating with other wireless terminals of the respective ad hoc network in the respective different communication channel, the splitting unit comprising an operating unit configured to decide which of said plurality of wireless terminals are to be moved to said new wireless ad hoc network and which of said plurality of wireless terminals remain in the wireless ad hoc network, wherein
- the central controller checks whether more bandwidth than a certain amount of available bandwidth is required by said plurality of wireless terminals, and
- allocates additional bandwidth to the wireless ad hoc network or to the additional wireless ad hoc network when more bandwidth than the certain amount of available bandwidth is required.

11. The central controller according to claim 10, wherein the splitting unit includes:
- a sending unit configured to send out requesting commands (SPAWN_NETWORK) to wireless terminals; and
- a receiving unit configured to receive confirmation commands (SPAWN_NETWORK_ACK); wherein
- the operating unit further is configured to determine a wireless terminal of said plurality of wireless terminals and/or of said new wireless terminals that becomes the central controller of said new wireless ad hoc network.

12. The central controller according to claim 10, further comprising:
- a unit configured to transfer connection information necessary to communicate with said plurality of wireless terminals that are to be moved to said new wireless ad hoc network to a central controller of the additional wireless ad hoc network.

13. The central controller according to claim 10, further comprising:
- a unit configured to transmit the frequency of the communication channel of the additional ad hoc network to the wireless terminals of the additional ad hoc network.

* * * * *